United States Patent
Warmack et al.

(10) Patent No.: US 10,110,119 B2
(45) Date of Patent: Oct. 23, 2018

(54) POWER SUPPLY AND METHOD OF MANUFACTURING

(71) Applicant: UT-Battelle, LLC, Oak Ridge, TN (US)

(72) Inventors: Robert J. Warmack, Knoxville, TN (US); Charles L. Britton, Jr., Alcoa, TN (US); Milton Nance Ericson, Knoxville, TN (US); John P. Brainard, Albuquerque, NM (US)

(73) Assignee: UT-Battelle, LLC, Oak Ridge, TN (US)

( * ) Notice: Subject to any disclaimer, the term of this patent is extended or adjusted under 35 U.S.C. 154(b) by 186 days.

(21) Appl. No.: 15/101,642

(22) PCT Filed: Dec. 5, 2014

(86) PCT No.: PCT/US2014/068701
§ 371 (c)(1),
(2) Date: Jun. 3, 2016

(87) PCT Pub. No.: WO2015/085126
PCT Pub. Date: Jun. 11, 2015

(65) Prior Publication Data
US 2016/0308434 A1    Oct. 20, 2016

Related U.S. Application Data

(60) Provisional application No. 61/912,828, filed on Dec. 6, 2013.

(51) Int. Cl.
*H02M 3/07*    (2006.01)
*H02M 7/10*    (2006.01)

(52) U.S. Cl.
CPC ............. *H02M 3/07* (2013.01); *H02M 7/106* (2013.01)

(58) Field of Classification Search
CPC ........ H02M 3/07; H02M 7/106; H02M 7/103; H02M 7/10; H02M 7/04; H02M 7/02
See application file for complete search history.

(56) References Cited

U.S. PATENT DOCUMENTS 3,568,036 A      3/1971  Rosenberg
3,869,659 A  *  3/1975  Doong ................. H01J 49/022
                                                              324/459

(Continued)

OTHER PUBLICATIONS

International Search Report and Written Opinion of the International Searching Authority for International Application No. PCT/US14/68701 dated Mar. 4, 2015.

*Primary Examiner* — Adolf Berhane
*Assistant Examiner* — Bart Iliya
(74) *Attorney, Agent, or Firm* — Warner Norcross + Judd LLP

(57) ABSTRACT

A multiplier assembly for a power supply and a method of manufacturing the multiplier assembly. The multiplier assembly may be a stack of capacitors and support elements electrically and mechanically coupled together to form a first capacitor string and a second capacitor string. The support elements may electrically and mechanically connect adjacent series capacitors in the first capacitor string. Additionally or alternatively, the support elements may electrically and mechanically connect adjacent series capacitors in the second capacitor string. In one embodiment, the power supply may include drive and feedback circuitry capable of controlling operation of the multiplier assembly.

30 Claims, 9 Drawing Sheets

(56) References Cited

U.S. PATENT DOCUMENTS

| | | | |
|---|---|---|---|
| 3,902,108 A | | 8/1975 | Sion |
| 4,010,535 A | * | 3/1977 | Hishiki ................ H02M 3/335 257/909 |
| 4,389,703 A | | 6/1983 | Morel et al. |
| 5,008,800 A | | 4/1991 | Klinkowstein |
| 5,384,287 A | | 1/1995 | Fukase |
| H001423 H | | 4/1995 | Flesner et al. |
| 5,983,472 A | * | 11/1999 | Fayram ................ A61N 1/3956 29/25.03 |
| 2005/0063131 A1 | * | 3/2005 | Perkins ................ B05B 5/0531 361/227 |
| 2009/0041192 A1 | * | 2/2009 | Sundaram ................ H05G 1/04 378/103 |
| 2012/0262959 A1 | | 10/2012 | Hanington |

* cited by examiner

POWER SUPPLY AND METHOD OF MANUFACTURING

This invention was made with government support under Contract No. DE-AC05-00OR22725 awarded by the U.S. Department of Energy. The government has certain rights in the invention.

FIELD OF THE INVENTION

The present invention relates to a high-voltage power supply, and more particularly, to a high-voltage power supply including a multiplier assembly and a method of manufacturing the high-voltage power supply with the multiplier assembly.

BACKGROUND OF THE INVENTION

High-voltage power supplies have been around for many years. In one type of conventional high-voltage power supply, a multi-stage circuit topology (often referred to as a Cockroft Walton multiplier) is utilized to provide an output voltage larger than the supply voltage. The most often used construction of the Cockroft Walton multiplier includes a first string of capacitors connected laterally to a second string of capacitors through polarized sets of diodes. The orientation of the diodes determines the output polarity at the end of the string. This multiplier circuit topology is also often times described in terms of multiple stages, each comprising a pair of capacitors and a pair of diodes. Each stage may be connected to another stage to form a multi-stage multiplier circuit.

An AC voltage source or pulsing DC voltage source injected into the first string of capacitors of the multiplier circuit may cause charge to flow in each capacitor in a manner that adds voltage of each successive stage. The voltage at the end of the second string, or DC string, approaches as much as twice the input voltage times the number of stages in the multiplier. In this configuration, the components in each stage, comprising two diodes and two capacitors, may be subjected to the input voltage and not the total voltage output of the power supply. Thus, the multiplier circuit may utilize standard components with lower design limits than would otherwise be used if they were subjected to the total voltage output of the power supply.

A practical example of this conventional, Cockroft Walton power supply is depicted in FIG. 2. As shown, a 12-stage multiplier is constructed of standard electronic components, where each stage of the multiplier includes two 15 kV diodes and two 1000 pF, 15 kV capacitors. The depicted power supply assembly is approximately 9 inches long. An encapsulated transformer is energized to produce a supply voltage of approximately 8.5 kVAC. With this supply voltage, the depicted power supply may generate an output voltage of approximately 100 kV with individual components rated for 15 kV or less.

Due at least in part to the ability of the Cockroft Walton power supply to generate significant output voltages, it has been used in many applications throughout the years. However, this type of multiplier circuit is not without drawbacks. For example, depending on the application, excessive electric fields generated in the power supply may lead to ionization, power loss, flashover, and breakdown, or a combination thereof. In an effort to avoid one or more of these adverse effects, conventional Cockroft Walton power supplies, such as the one depicted in FIG. 2, may be submerged in an insulating liquid or gas. The insulating liquid or gas may prevent flashover resulting from the large electric fields generated by the power supply.

In some conventional implementations of the Cockroft Walton power supply, the multiplier components are loosely soldered together, relying on each part hanging from the other, and using loosely controlled mechanical attachment techniques. Variations in the spacing of components during fabrication or use may lead to variations in performance and possible failure. Additionally, the length and diameter of such a conventional multiplier often times is associated with a large housing.

SUMMARY OF THE INVENTION

The present invention provides a multiplier assembly for a power supply. In one embodiment, the multiplier assembly may be a stack of capacitors and support elements electrically and mechanically coupled together to form a first capacitor string and a second capacitor string. Each of the support elements may electrically and mechanically connect adjacent series capacitors in the first capacitor string. Additionally or alternatively, each of the support elements may electrically and mechanically connect adjacent series capacitors in the second capacitor string.

In one embodiment, the multiplier assembly may include a power input, a power output, a first plurality of capacitors, and a second plurality of capacitors. The first plurality of capacitors may be coupled electrically and mechanically to form a first capacitor string, which may be connected to the power input. The second plurality of capacitors may be coupled electrically and mechanically to form a second capacitor string, which may be connected to the power output. The first and second capacitor strings may define a plurality of stages of the multiplier assembly. The multiplier assembly may also include a plurality of support elements that mechanically support the first and second plurality of capacitors such that each of the plurality of stages includes at least one stage support element from among the plurality of support elements. The at least one stage support element may electrically connect at least two of the first plurality of capacitors and at least two of the second plurality of capacitors.

In one embodiment, a first stage of the multiplier assembly, potentially coupled directly to the power input, may include a first stage support element electrically connected to a first capacitor of the first plurality and a second capacitor of the second plurality such that the first stage support element does not electrically connect capacitors from an adjacent stage to the first and second capacitors. A final stage of the multiplier assembly, potentially coupled directly to the power output, may include an additional support element electrically connected to capacitors of the first and second pluralities. The additional support element may aid in terminating the first and second capacitor strings.

In one embodiment, the multiplier assembly may include a plurality of diodes, each of which may form at least part of an electrical connection between the first capacitor string and the second capacitor string. In one embodiment, capacitor connection terminals of the support element may be undersized relative to the terminals of the capacitors. By undersizing the capacitor connection terminals, reduced field distribution on the surface of the support element may be achieved.

In one embodiment, each stage may include at least two stage support elements, which may be separable from each other. A first of the at least two stage support elements may electrically connect adjacent capacitors in series in the first capacitor string, and a second of the at least two stage support elements may electrically connect adjacent capacitors in the second capacitor string. With the stage support elements being separable, they may not share a substrate. Accordingly, surface conduction between the first and second stage support elements may be avoided.

In one embodiment, the support elements may include spaces or conductive breaks that reduce or minimize surface conduction between two portions of the supporting element. For example, due in part to the high-voltage characteristics of the multiplier assembly, there may be sizable electric field differences present between conductive features and portions of the support element, or combinations thereof. Spaces of the support element may aid in preventing conduction through the support element, which may otherwise result from the large electric field differences.

In one embodiment, the multiplier assembly may include a dielectric that at least partially surrounds the plurality of support elements and the capacitors. For example, in embodiments in which the multiplier assembly is cylindrical, the dielectric may be in the form a tube in which components of the multiplier assembly may be disposed. The multiplier assembly may also include a shield disposed along a central axis of the assembly through a space defined by each of the support elements.

In one aspect, a method of manufacturing the multiplier assembly includes providing first and second pluralities of capacitors, and stacking a plurality of support elements, the first plurality of capacitors, and the second plurality of capacitors such that the first plurality of capacitors form a first capacitor string and the second plurality of capacitors form a second capacitor string. Within this stack, each of the first plurality of capacitors of the first string may be electrically and mechanically connected to an adjacent capacitor of the first capacitor string by at least one of the support elements. And, each of the second plurality of capacitors of the second string may be electrically and mechanically connected to an adjacent capacitor of the second capacitor string by at least one of the support elements.

In one aspect, a multistage power supply according to one embodiment may conserve space over a conventional high-voltage power supply. For example, the multistage power supply may be a fraction of the size of a conventional power supply with similar input and output specifications, and may consume a reduced amount of power as compared to such a conventional supply. The multistage power supply may be formed to create a mechanically and electrically robust high-voltage power supply. In one embodiment, the power supply may be used in a variety of applications, including, for example, X-ray systems, particle accelerators, electrostatic purifiers, neutron generators, oil-well logging, ionizers, copy machines, and bug zappers. The power supply according to one embodiment may be operated using batteries due to its improved efficiency over conventional power supplies.

In one aspect, a high-voltage power supply according to one embodiment may be smaller or more compact than a conventional power supply, and may be provide improved mechanical and electrical performance. A significant reduction in the size of the power supply may be achieved through the use of circuit boards, alignment guides, modified commercial parts, and a controlled electrical/mechanical attachment process. Each circuit step (or stage) in the circuit ladder may be compartmentalized for ease of manufacturing, and ease of modifying the ladder for a variety of voltages. A ladder or multiplier assembly formed in accordance with one embodiment may control electric fields to prevent excessive electrical stress and flashover, and may enable the reproducible manufacture of a compact high-voltage power supply that may be mechanically and electrically stable.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 1:
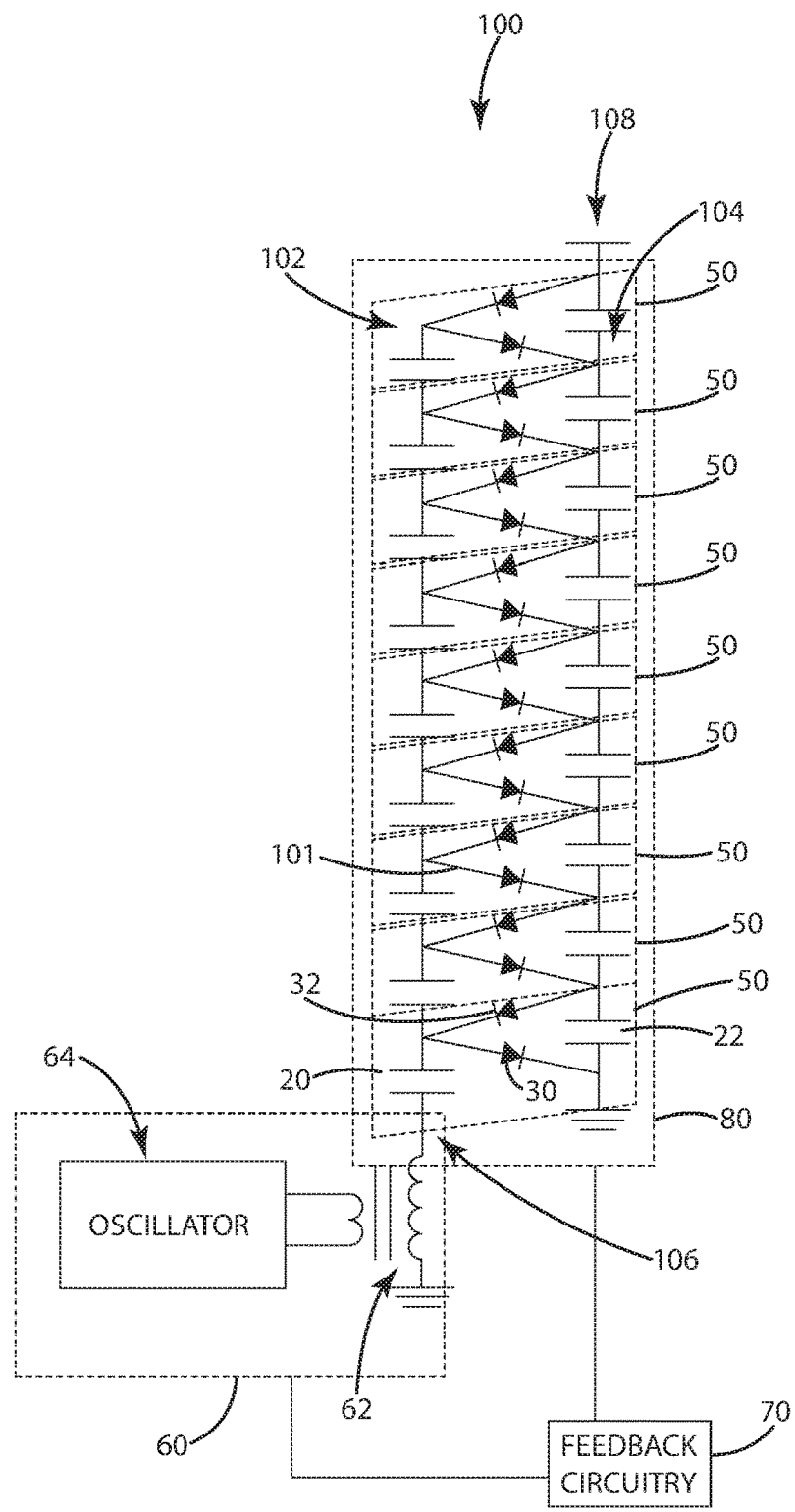
FIG. 1 shows a schematic representation of a power supply according to one embodiment.
Figure 3:
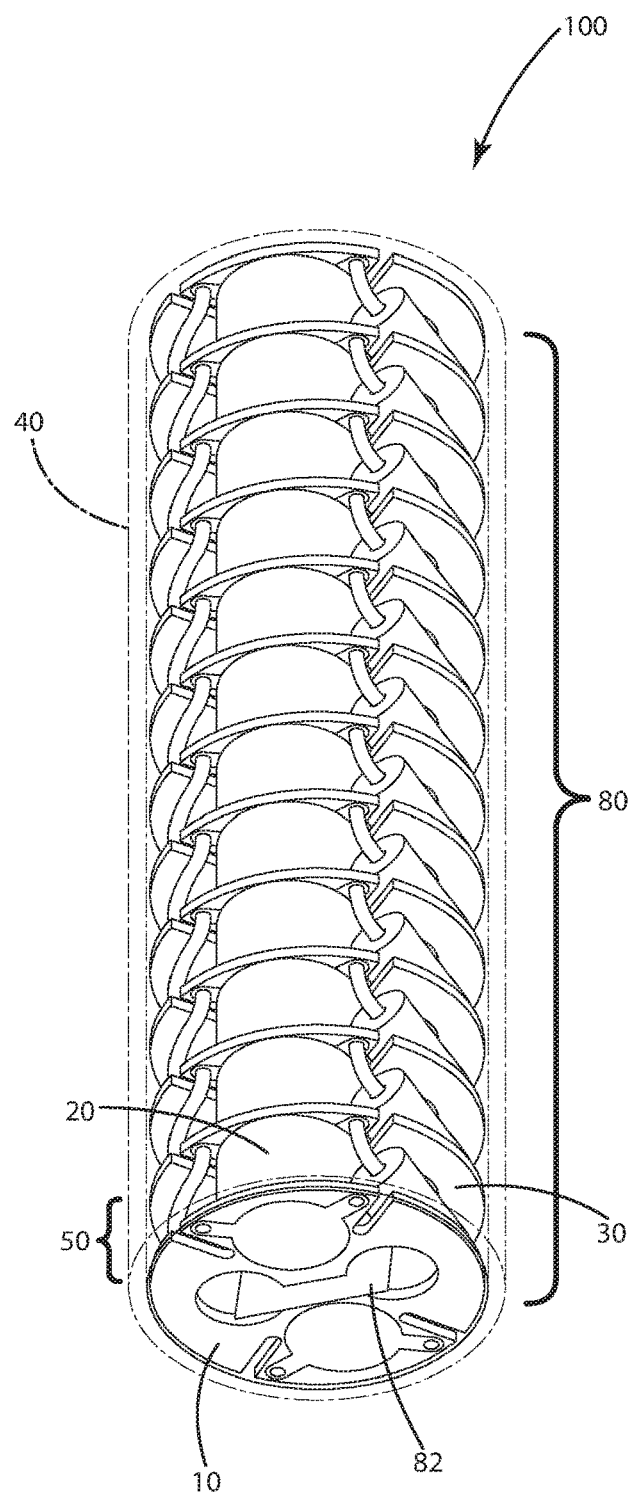
FIG. 3 shows a 13-stage multiplier assembly according to one embodiment.
Figure 4:
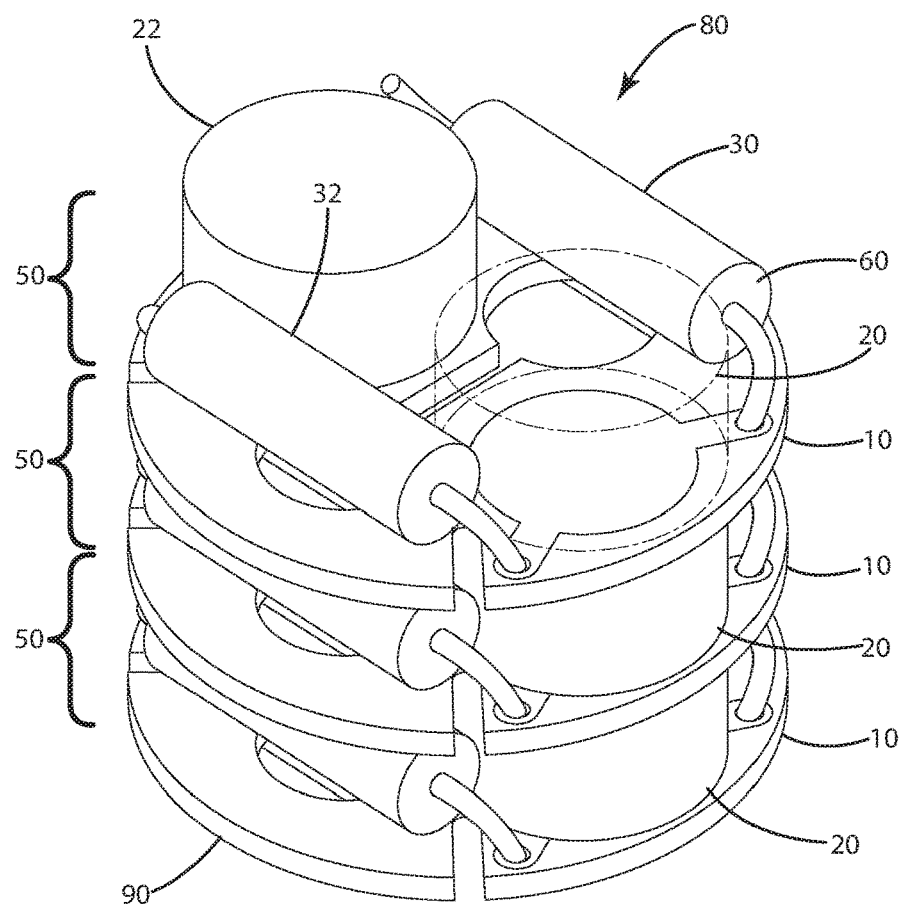
FIG. 4 shows a 3-stage multiplier assembly according to one embodiment.

A power supply in accordance with an embodiment of the present invention is shown in FIGS. 1, 3 and 4, and generally designated 100. In one embodiment, the power supply 100 may include a multiplier assembly 80 with multiple stages 50 according to a Cockroft Walton multiplier. One or more stages 50 of the multiplier 80 may include capacitors 20, 22 and diodes 30, 32 connected to form two capacitor strings 102, 104 and a diode string 101. Each stage 50 of the multiplier assembly 80 may also include at least one support element 10 configured to electrically and mechanically couple components of the multiplier assembly 80. For example, the support element 10 may be formed of a circuit board that electrically and mechanically couples one or more components of each respective stage 50 to one or more components of adjacent stages 50. The stages 50 may be arranged in a stacked configuration to form a multiplier circuit. For example, the capacitors of each capacitor string 102, 104 may be stacked with a plurality of respective support elements 10 therebetween. In other words, each capacitor 20, 22 in the capacitor strings 102, 104 may be electrically and mechanically coupled to an adjacent capacitor in a respective string by a support element 10.

Figure 2:
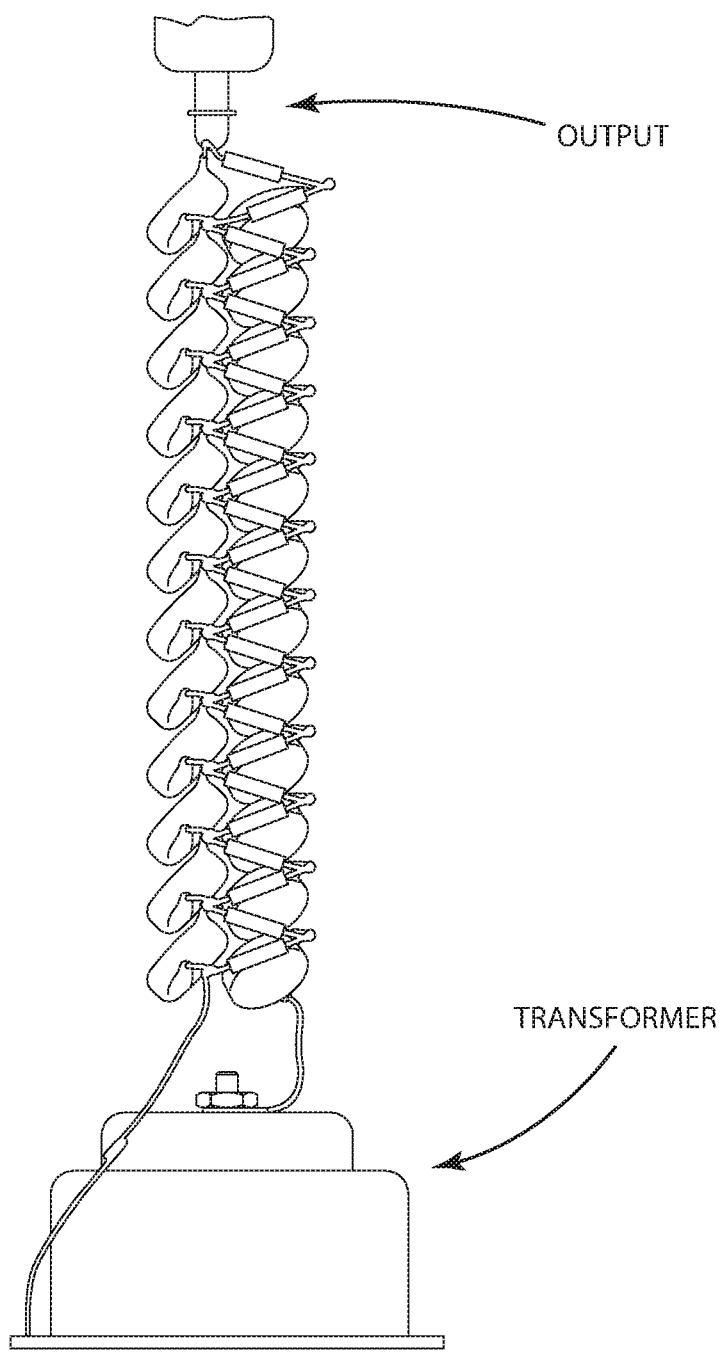
FIG. 2 shows a conventional power supply including a Cockroft Walton multiplier.
Figure 7:
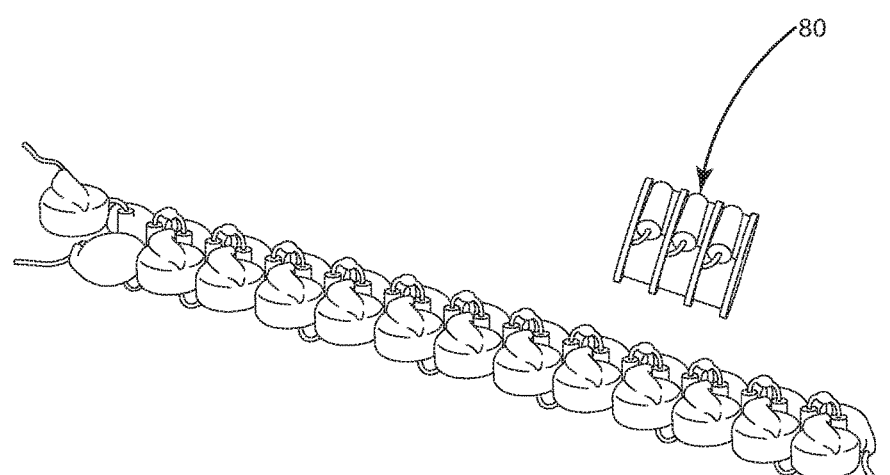
FIG. 7 shows a 3-stage multiplier assembly according to one embodiment alongside a conventional Cockroft Walton multiplier.

By utilizing one or more support elements 10 in conjunction with each stage 50, a stack of stages 50 may be formed. In this way, a power supply 100 including a multiplier assembly 80 according to one embodiment may achieve a significant reduction in space over conventional power supplies. For example, as can be seen in FIG. 3, a multiplier assembly 80 according to one embodiment includes 13 stages, and is approximately 2.5 inches long and capable of producing greater than 100 kV at 10 µA. The capacitors 20, 22 and diodes 30, 32 in this example are rated to 15 kV. In this example, the power supply 100 including multiplier 80 may produce about 1 W and may consume about 2 W. This amount of power may be provided by two standard D-cell batteries for approximately 8 hours. The multiplier assembly 80 in the illustrated embodiment is also comparative in size to a dime. In contrast, the conventional power supply depicted in FIG. 2 includes 12 stages, and is approximately 9.5 inches long. FIG. 7 also depicts a multiplier assembly 80 according to one embodiment with 3 stages as compared to a conventional multiplier with 12 stages.

As shown in the illustrated embodiments of FIGS. 1, 3 and 4, a power supply 100 according to one embodiment may include multiple stages 50 to form the multiplier assembly 80 or a power stack. Each stage 50 of the multiplier assembly 80 may include at least two capacitors 20, 22 and at least two diodes 30, 32. The capacitors and diodes in each stage 50, as mentioned herein, may be coupled electrically and mechanically to adjacent stages 50 to form a first string 102 of capacitors connected laterally to a second string 104 of capacitors through polarized sets of diodes. In this configuration, the output voltage 108 at the end of the second string 104 may be about twice the voltage of the power input 106 times the number of stages 50 in the power supply 100.

In the illustrated embodiments of FIGS. 3 and 4, each multiplier stage 50 of the multiplier assembly 80 may include at least one support element 10. The support element 10 of each multiplier stage 50 may be configured to enable each multiplier stage 50 to electrically and mechanically couple to an adjacent multiplier stage 50. Put differently, the support element 10 of each multiplier stage 50 may electrically and mechanically couple adjacent capacitors 20 of the first capacitor string 102, and may electrically and mechanically couple adjacent capacitors 22 of the second capacitor string 104. As will be described herein in connection with FIG. 6, the capacitors may be disk-shaped with opposing terminal sides 624, 626. The terminal sides 624, 626 of the capacitors may be stacked together to form the first and second capacitor strings 102, 104 with supporting elements 10 between each electrically connected set of terminals 624, 626.

In this way, a plurality of multiplier stages 50 may be stacked together to form a multiplier assembly 80. In the illustrated embodiment of FIG. 3, the multiplier assembly 80 includes a plurality of multiplier stages 50 stacked one on top of the other. For example, each capacitor 20, 22 and diode 30, 32 of a multiplier stage 50, may be electrically coupled to each other via a respective support element 10 according to the multiplier circuit topology illustrated in FIG. 1. Additionally, the respective support element 10 of each multiplier stage 50 may enable adjacent multiplier stages to electrically couple to capacitors 20, 22 and diodes 30, 32 according to the multiplier circuit topology. As shown in FIG. 4, three multiplier stages 50, or multiplier segments, are shown with axial leads on the end of the diodes and with some components being transparent for illustration purposes. The multiplier assembly 80 may include an additional, terminal support element 10 disposed at an end 90 to provide support for a multiplier stage 50 at the end 90. A multiplier stage 50 at an end 60 opposite the end 90 is shown without a terminal support element for purposes of disclosure, but may include a terminal support element to facilitate electrical connections between the first and second capacitor strings. In the illustrated embodiment, the capacitor 20 of the stage 50 near the end 60 may be connected to the power input 106, and the capacitor 22 of the stage 50 near the end 60 may be connected to ground. And, the additional terminal support element disposed at the end 90 may provide an electrical connection between the second capacitor string and the power output 108.

In the illustrated embodiment of FIG. 4, the support element 10 is a circuit board, and the capacitors 20, 22 and diodes 30, 32 are soldered to the circuit board according to the circuit topology of FIG. 1. As shown, the circuit board includes pads and conductive tracks that enable electrical connections to the capacitors 20, 22 and the diodes 30, 32. The circuit board may include a pad and conductive tracks on both sides, thereby enabling electrical connections to components of an adjacent multiplier stage 50, such as capacitors 20, 22 and diodes 30, 32 of the adjacent multiplier stage 50. In one embodiment, using components rated for 15 kV and disk capacitors similar to those depicted in FIG. 6, each multiplier stage 50 of the multiplier assembly 80 may be approximately 5 mm in overall height. It should be understood that the overall height of each multiplier stage 50 may vary from application to application depending on specifications and components.

Figure 11:
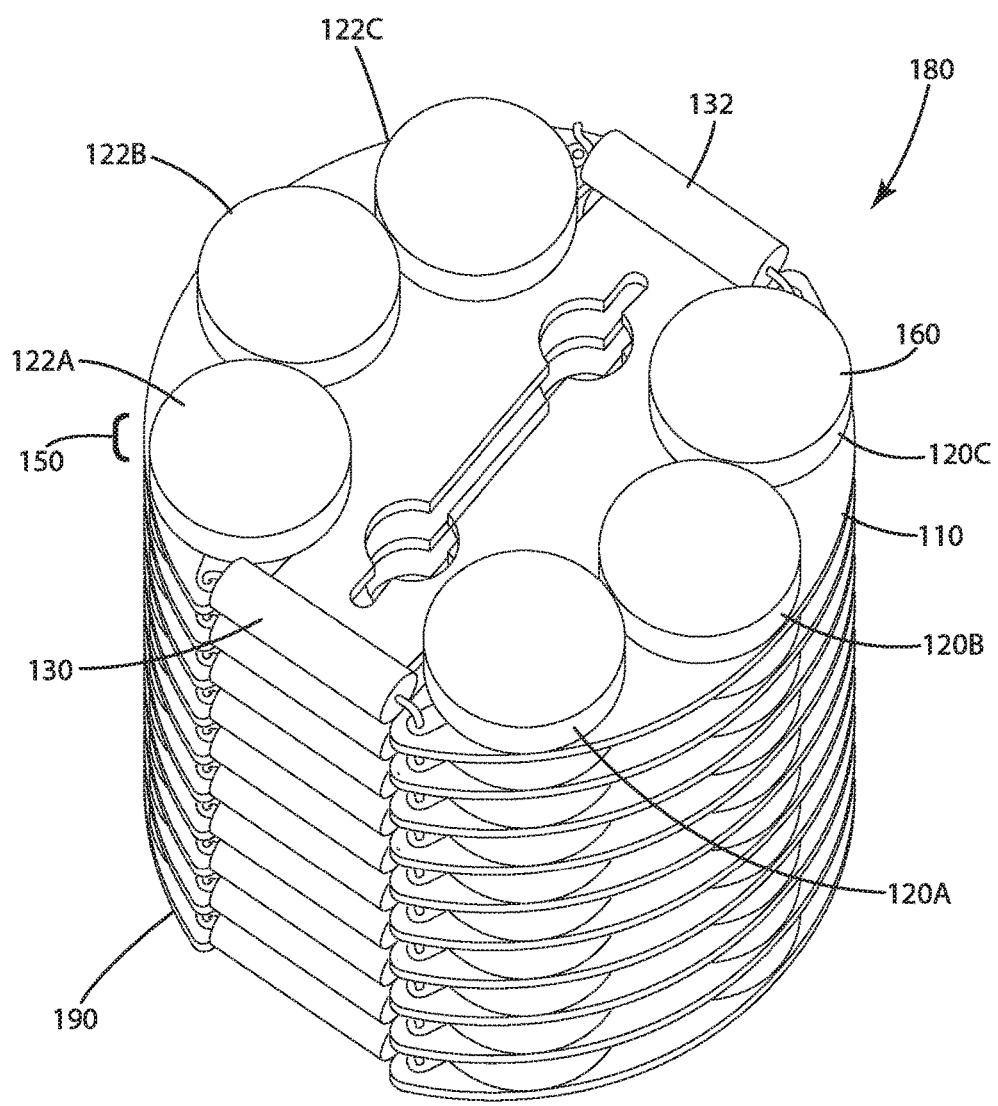
FIG. 11 shows a 10-stage multiplier assembly according to one embodiment.

In an alternative embodiment, depicted in FIG. 11, a multiplier assembly 180 may be similar to the multiplier assembly 80 described in connection with the illustrated embodiments of FIGS. 1, 3 and 4, with several exceptions. The multiplier assembly 180 may include a plurality of stages 150 and a plurality of support elements 110, similar to the stages 50 and support elements 10 of the multiplier assembly 80. In the illustrated embodiment of FIG. 11, each stage 150 of the multiplier assembly 180 may include a plurality of capacitors 120a-c, 122a-c. The plurality of capacitors 120a-c, 122a-c may be connected in a manner similar to the capacitors 20, 22 of the multiplier assembly 80 to form first and second capacitor strings. The multiplier assembly 180 may also include a plurality of diodes 130, 132 electrically connected to form at least a portion of an electrical connection between the first and second capacitor strings. For purposes of disclosure, the end stage 160 of the multiplier assembly 180 is shown without a terminating support element. However, it should be understood that a support element or terminating support element may be electrically connected to the capacitors 120a-c, 122a-c and diode 132 to provide mechanical support and electrical connections to provide a power input. In particular, the capacitors 120a-c of the end stage 160 may form a first segment in the first string to which input power is connected, and the capacitors 122a-c of the end stage 160 may form a first segment in the second string to which ground is connected. The power output may be connected to the final segment of the second string near the output end stage 190.

In the illustrated embodiment, each stage 150 of the multiplier assembly may include a plurality of capacitors 120a-c connected in parallel to form a segment of the first string, and a plurality of capacitors 122a-c connected in parallel to form a segment of the second string. One or more of the support elements 110 may be configured to electrically connect the plurality of capacitors 120a-c in parallel and in series with a plurality of capacitors in an adjacent stage, as described herein in connection with the illustrated embodiment of FIGS. 1 and 3-5. By utilizing a plurality of capacitors for each segment of the capacitor strings in the stages 150, some configurations may achieve larger capacitances for each segment. The multiplier assembly 180 in FIG. 11 is a 10-stage assembly, but it should be understood that more or fewer stages may be used.

The supporting element 10 will now be described in further detail in connection with FIG. 5. As mentioned above, the supporting element 10 may be capable of electrically connecting capacitors and diodes according to the circuit topology of FIG. 1. The supporting element 10 may include a substrate 11 upon which conductive features may be disposed. In one embodiment, the conductive features may be laminated to the substrate 11. As an example, the substrate 11 may be formed of heat resistant, high-voltage hold-off material, such as polyimide, and the conductive features may be formed of 2 oz. per square foot copper (approximately 2.8 mil thickness). The conductive features may be formed on both sides of the substrate 11, and may include capacitor pads 12a-b for respective capacitor pairs 20, 22 and diode pads 14a-d with through holes for soldering leads of the diodes 30, 32.

Figure 5:
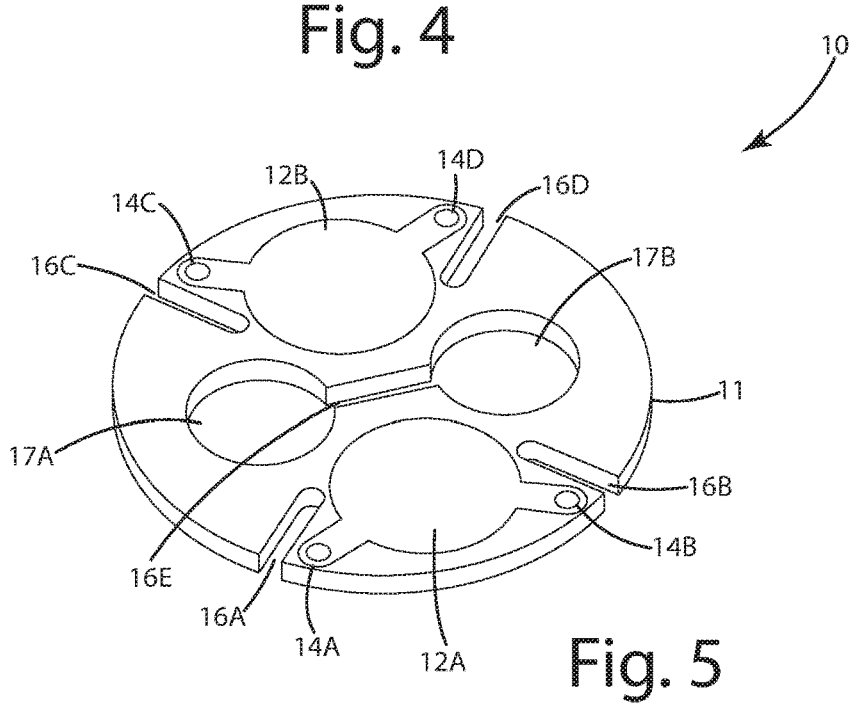
FIG. 5 shows a support element according to one embodiment.

The conductive features on the opposite side of the support element 10 may mirror the conductive features shown in the illustrated embodiment of FIG. 5. The conductive features on opposing sides of the support element 10 may be electrically coupled to each other via diode leads soldered to both sides of the substrate 11, or by conductive through hole vias associated with one or more of the diode pads 14a-b. In this way, the capacitor 20, 22 of an adjacent multiplier stage may be soldered to the support element 10, and electrically connected to components of the multiplier stage 50 according to the multiplier circuit topology shown in FIG. 1. Additionally, one of the diodes of an adjacent multiplier stage may be soldered to the support element 10 such that the diode is electrically connected to at least one capacitor 20, 22 and at least one diode 30, 32 of the multiplier stage 50.

In one embodiment, the capacitor pads 12a-b of the support element 10 may be undersized relative to end plates of each capacitor 20, 22. For example, in configurations with disk shaped capacitors 20, 22, each having a round end plate or terminal, the diameter of the capacitor pads 12a-b for connecting to each respective capacitor 20, 22 may be less than the diameter of the terminal of each capacitor 20, 22. By undersizing the capacitor pads 12a-b relative to the terminals of the capacitors 20, 22, the support element 10 according to one embodiment may achieve reduced field distribution on the surface of the substrate 10 within the perimeter of the terminals or capacitor plates. Such a reduced field distribution may help to prevent surface current losses or flashover along the surface of the substrate 10.

The support element 10 in one embodiment may include one or more spaces 16a-e or slots that physically separate portions of the support element 10. The spaces 16a-e may form electric barriers to surface conduction on the support element 10. Voltages across the surface of the support element 10 may be on the order of 10 kV or higher. By forming one or more spaces 16a-e in the substrate, flashover or arcing between two components or conductive features may be avoided. In the illustrated embodiment of FIG. 5, the spaces 16a-d may be respectively positioned in proximity to the diode pads 14a-d to form an electrical break between each respective diode pad 14a-d and another, proximate diode pad 14a-d. Additionally, a space 16e may be positioned between the capacitor pads 12a-b to form an electrical break therebetween. In one embodiment, the width of the spaces 16a-e may range from 0.025 to 0.040 inches. However, it should be understood that width and size of the spaces 16a-e may vary from application to application depending on specifications and components The support element 10 may include one or more holes 17a-b that facilitate assembly during manufacture. Alignment pins or rods (not shown) may be inserted into the holes 17a-b to aid in aligning the capacitors 20, 22 and diodes 30, 32 of each multiplier stage 50. Once the multiplier assembly 80 has been soldered, the alignment pins or rods may be removed. In the illustrated embodiment of FIG. 5, the holes 17a-b may further serve to form an electrical break in the substrate 11, similar to the space 16e between conductive features, thereby potentially avoiding the occurrence of flashover or arcing.

In an alternative embodiment, each stage 50 of the multiplier assembly 80 may include a plurality of support elements 10. Each capacitor 20, 22 of a stage 50 may be electrically and mechanically coupled to a separate support element. For example, the support element 10 may include (a) a first metal plate positionable between the capacitor 20 and a capacitor of an adjacent stage, and (b) a second metal plate positionable between the capacitor 22 and another capacitor of the adjacent stage. In other words, the capacitors 20 in the first capacitor string 102 are coupled together via support elements 10 separate from the support elements 10 used to couple the capacitors 22 in the second capacitor string 104. The support elements 10 in this embodiment may include contacts for electrically and mechanically connecting to diodes 30, 32 according to the multiplier circuit topology of FIG. 1. By using separate support elements 10 for the capacitors 20, 22 of each stage 50, surface conduction paths, such as those potentially available in embodiments that use circuit boards, may be substantially avoided or eliminated.

As depicted in FIGS. 3 and 4, the multiplier assembly 80 may be arranged in a generally cylindrical assembly with circular support elements 10. It should be understood, however, that the shape and construction of the support elements 10 and the multiplier assembly 80 may vary from application to application, depending on design parameters.

In one embodiment, the multiplier assembly 80 may be at least partially surrounded by a dielectric 40. The dielectric 40 in the illustrated embodiment of FIG. 3 is a cylindrical structure capable of mechanically stabilizing the multiplier assembly 80. The dielectric may also be capable of stabilizing the electric fields and reducing corona of the multiplier assembly 80. As an example, the dielectric 40 may be formed of silica or any other material capable of providing dielectric properties suitable for the application and desired input/output characteristics of the multiplier assembly 80. By including the dielectric 40 in the power supply 100, the multiplier assembly 80 may be packaged compactly inside a grounded structure (not shown), such as a grounded coaxial cylinder at least partially surrounding the dielectric 40.

In one embodiment, the multiplier assembly 80 may also include a shield 82 or insulating strip disposed along the length of the multiplier assembly 80, and between the capacitors 20, 22 of each stage 50. In the illustrated embodiment, the shield 82 is disposed along the primary axis of the multiplier assembly 80 through the spaces 16e formed in the supporting elements 10 (FIG. 5). The shield 82 may operate as an internal corona shield. For example, a shield 82 in the form of a Teflon®-strip may reduce or minimize corona discharge. Reducing or minimizing corona discharge may avoid partial discharge of electrical energy.

At least one of the shield 82 and the dielectric 40 may be floated or electrically isolated, or electrically driven to potentially achieve a reduced AC load of the multiplier assembly 80, thereby potentially enabling efficient operation. The effective DC capacitance of the multiplier assembly 80 is about twice the series capacitance of each string in addition to stray capacitance to the surroundings. For example, in a multiplier assembly 80 that includes 1000 pF capacitors in each of the capacitor strings 102, 104 to form a 10-stage multiplier, the capacitance of the multiplier assembly 80 may be 200 pF.

To prevent breakdown, at least a portion of the multiplier 80 according to one embodiment may be operated in a dielectric medium (not shown), such as a high-field strength dielectric medium. Examples of such a medium include dielectric epoxies and other potting compounds, dielectric fluids (e.g., Fluorinert), and dielectric gases. In some solid and liquid dielectrics, presence of bubbles and long-term dielectric degradation may limit the usefulness of the dielectric. Gaseous dielectrics may be less susceptible to these effects. For example, sulfur hexafluoride (SF6) at 5-10 atmospheres or 5-10 bar may have a breakdown strength on the order of 1000 V/mil and a low dielectric constant (about 1). The useful lifetime of SF6 in this environment may be improved if corona is reduced or minimized (e.g., by rounding sharp, high field-points). In one embodiment, rounding sharp, high field-points may be achieved through the use of soldering techniques to produce smooth, rounded surfaces. Smooth, rounded surfaces may be associated with lower maximum electric fields than surfaces that are less smooth or round, or both.

Figure 6:
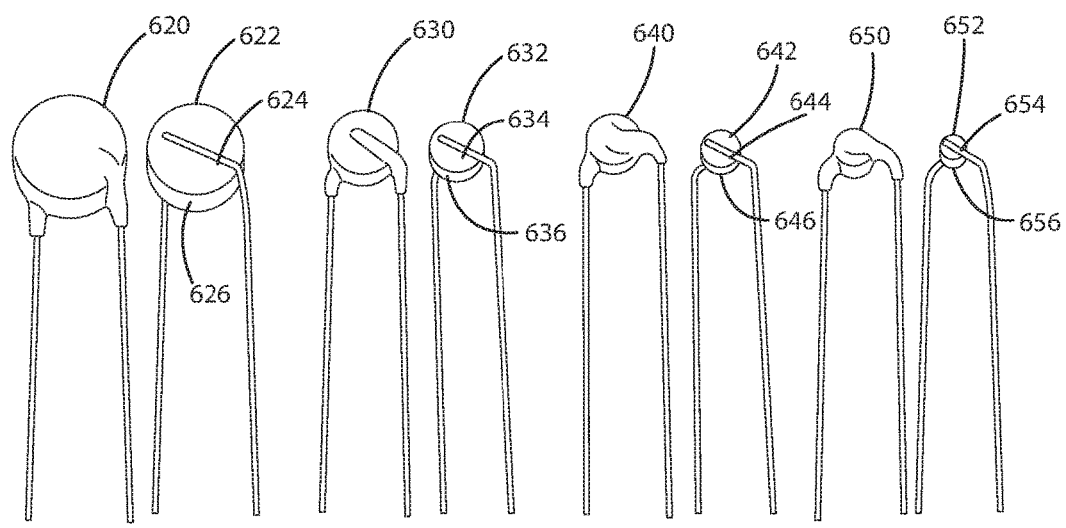
FIG. 6 shows a variety of capacitors in modified and unmodified states according to one embodiment.

A variety of capacitors capable of being used in a power supply according to one embodiment are depicted in FIG. 6. Capacitors 20, 22 described in connection with the illustrated embodiment of FIGS. 1, 3 and 4 may be similar to one or more of the capacitors depicted in FIG. 6. As mentioned herein, the power supply 100 according to one embodiment may utilize standard components available commercially. For example, epoxy coated disk capacitors may include suitable properties, such as capacitance and voltage rating, depending on the application. FIG. 6 illustrates epoxy coated disk capacitors 620, 630, 640, 650 ranging in capacitance from 1000 pF to 150 pF. According to one embodiment, a method of manufacturing the power supply 100 may include stripping away the epoxy coating of a capacitor and removing the leads to obtain a disk capacitor having terminals capable of being soldered to a support element 10. FIG. 6 depicts pairs of capacitors, one with the epoxy coating 620, 630, 640, 650 and the other stripped of its coating 622, 632, 642, 652. In this embodiment, the epoxy coating of the capacitors may be stripped away using at least one of a heat gun and a heated chisel. And, the leads may be removed with a soldering iron or a heat gun. In order to prepare the disk capacitors 622, 632, 642, 652 to be soldered to a support element 10, the terminal surfaces 624, 626, 634, 636, 644, 646, 654, 656 may be planarized by briefly rubbing on a heated plate. Planarizing may remove irregularities in the terminal surfaces 624, 626, 634, 636, 644, 646, 654, 656. The disk capacitors 622, 632, 642, 652 may be cleaned and inspected after this process to confirm they are suitable for use. It should be noted that although capacitors of different capacitance values are shown and described in connection with FIG. 6, the power supply 100 in one embodiment may incorporate a plurality of similar type capacitors, including capacitors with the same labeled capacitance value and voltage rating. In manufacturing the power supply 100, capacitors stripped of an epoxy coating and prepared for soldering to a support element 10 may be coated with flux and stacked with the support element 10 and diodes for reflow soldering.

Returning to the illustrated embodiment of FIG. 1, the power supply 100 may include a power source 60 capable of providing an AC voltage source or a pulsing DC voltage source injected into the power input 106 of the multiplier assembly 80, such as the power input of the first string 102. In one embodiment, the power source 60 may include a high-voltage step up transformer 62 including a primary (or primary coil) and a secondary (or secondary coil) configured to excite the power input 106 in response to an input drive provided to the primary from a driver circuit 64. As an example, the driver circuit 64 may be an oscillator circuit capable of providing an input drive to the primary to couple power to the secondary, thereby exciting the power input 106.

The power supply 100 may include feedback circuitry 70 capable of providing feedback to the power source 60, which may utilize the feedback to control or affect the output of the power output 108. Feedback provided to the power source 60 may be indicative of one or more operating characteristics of the power supply 100, such as at least one of voltage level or amplitude, current level or amplitude, and phase. The one or more operating characteristics of the power supply 100 may be provided to and used as a basis by the power source 60 to adjust one or more parameters to affect operation.

For example, in an embodiment with the driver circuit 64, the power source 60 may include control circuitry configured to adjust or vary one or more parameters of the input drive based on feedback from the feedback circuitry 70. The one or more parameters may include at least one of operating frequency, voltage level, phase, and duty cycle. By controlling one or more parameters of the input drive based on feedback, the power source 60 may control or affect one or more characteristics of at least one of (a) the excitation signal provided from the secondary to the power input 106 and (b) the power output 108 of the multiplier assembly 80. For instance, the drive circuit 64 may control or affect the frequency and amplitude of the excitation signal provided from the secondary to the power input 106. Changing the signal provided to the power input 106 may affect the power output 108 from the multiplier assembly 80.

In one embodiment, the drive circuit 64 may generate and provide to the power input 106 an excitation signal having a harmonic with an appropriate amplitude to produce a desired output voltage from the power output 108 of the multiplier assembly 80. The driver circuit 64 may utilize a modulated pulse width (MPW) drive in which the duty factor of pulses is controlled to produce the desired output voltage from the power output 108. The MPW may be controlled based on feedback in the power supply 100, such as based on an input signal indicative of the output voltage from the power output 108, or by monitoring primary coil energy of the high-voltage step up transformer 62. The power source 60, by adjusting or controlling the periodicity of the pulses commensurate with resonances of the combined power supply and load, may affect at least one of the efficiency and output voltage of the power output 108. In one embodiment, by controlling the MPW, the driver circuit 64 may achieve optimized efficiency and output voltage.

Although the driver circuit 64 is described in connection with integrated control circuitry, it should be understood that control circuitry may be separate from the driver circuit 64. For example, the control circuitry may be separately coupled to the driver circuit 64 and the feedback circuitry 70 of the power supply 100, and may direct or command the driver circuit 64 to achieve a desired output voltage based on feedback from the feedback circuitry 70.

The feedback circuitry 70 may be configured in a variety of ways to provide feedback to the power source 60, as described herein. In one embodiment, the feedback circuitry 70 may be configured to indirectly monitor voltage output from the power output 108 by directly monitoring voltage output of one of the lower-voltage stages via a high-voltage resistor. For example, the high-voltage resistor may be electrically connected to one of the stages 50 other than the last stage 50 at which the power output 108 is connected, including, for instance, a stage 50 nearer to the power input 106 than the power output 108. In one embodiment, the feedback circuitry 70 may include a resistive strip deposited on a dielectric cylinder surrounding the plurality of stages 50. For example, the resistive strip may be formed of a continuous resistive coating disposed on the dielectric cylinder, and may connect the power output 108 to ground. As another example, the resistive strip may form a spiral resistive strip coating that connects the power output 108 to ground. The current or voltage, or both, associated with the resistive strip may be indicative of the voltage level of the power output 108 such that, by sensing the current or voltage, or both, the feedback circuitry 70 may allow the control circuitry to control or affect the power output 108.

Figure 8:
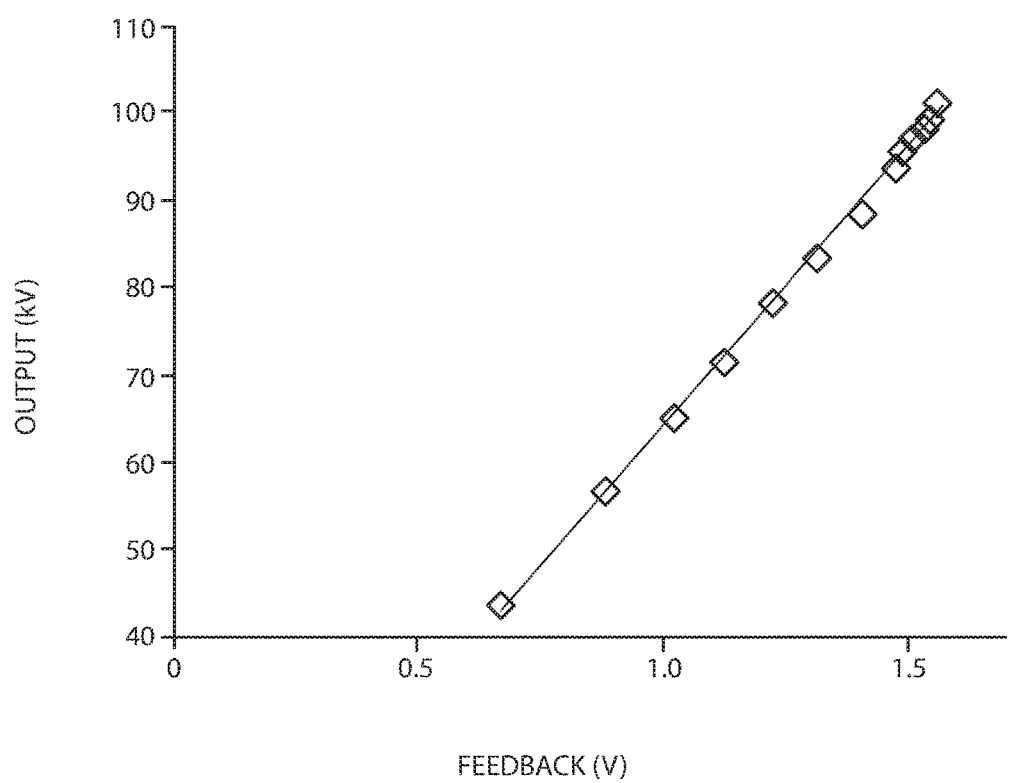
FIG. 8 is a plot showing a correlation between feedback and output voltage of a power supply according to one embodiment.

In one embodiment, the feedback circuitry 70 may include a pickup winding coupled to the primary of the transformer. The pickup winding may provide an output indicative of the primary coil energy and the voltage level of the power output 108. The feedback circuitry 70 may include at least one of conditioning circuitry and processing circuitry to calibrate the output from the pickup winding to the voltage level of the power output 108. As shown for example in FIG. 8, there may be a generally linear relationship between (a) the voltage level of a pickup winding coupled to the primary coil and (b) the voltage level of the power output 108. In this example, the voltage level of the power output 108 is determined by monitoring the current through one or more resistive loads for calibration, such as a 100 GΩ resistor or a 10 GΩ resistor. By calibrating feedback circuitry 70 with the voltage level of the power output 108, the feedback circuitry 70 may utilize lower-voltage components instead of high-voltage components, such as the 100 GΩ calibration resistor. Additionally, the feedback circuit 70, by indirectly obtaining feedback, may potentially avoid adversely affecting the power output 108.

Figure 9:
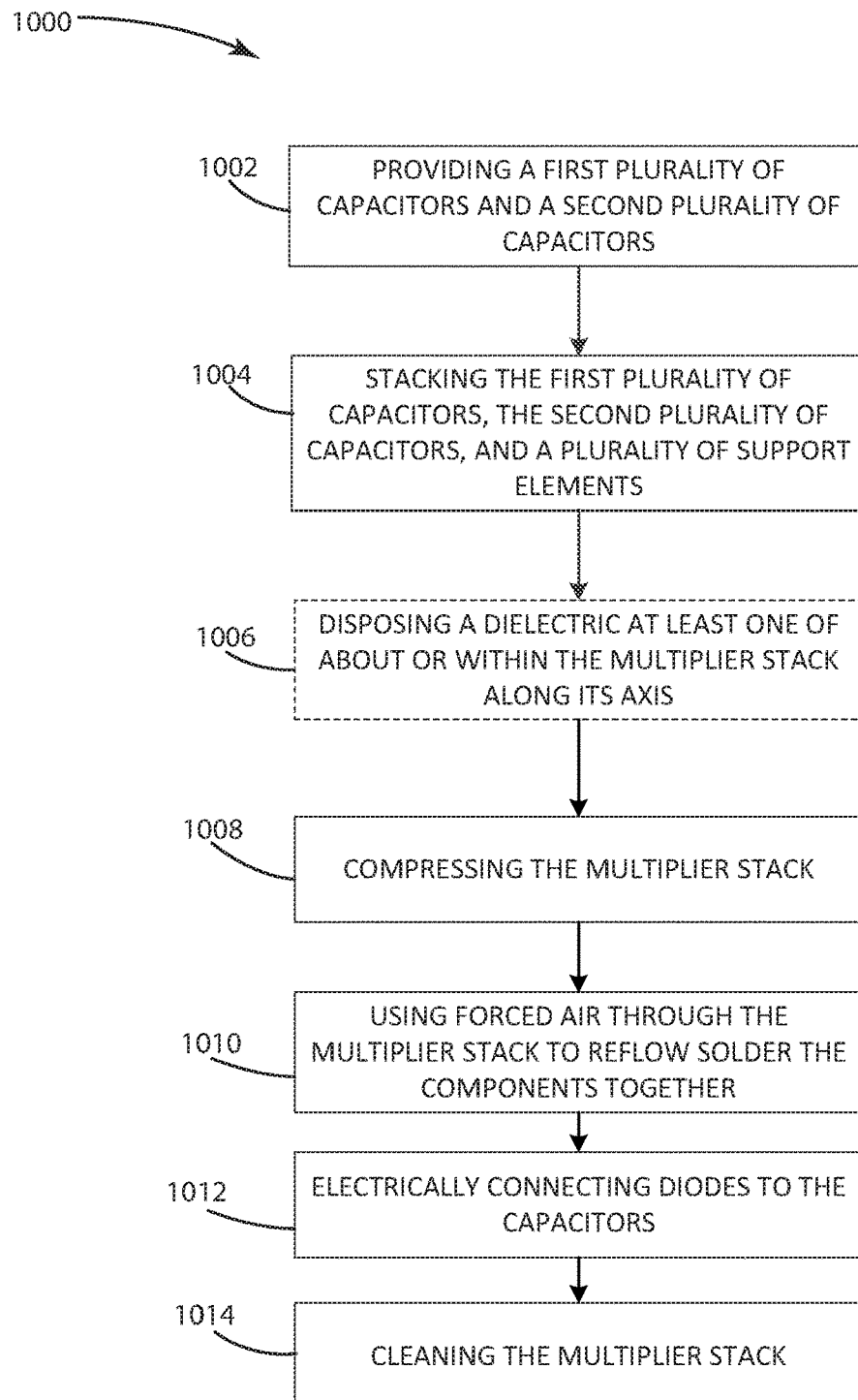
FIG. 9 is a method of manufacturing a multiplier assembly according to one embodiment.

A method of manufacturing a multiplier assembly for installation in a power supply is shown in FIG. 9, and generally designated 1000. For purposes of disclosure, the method 1000 is described in connection with manufacturing a multiplier assembly 180 using a jig 200 according to the illustrated embodiment of FIG. 10. However, it should be understood that the multiplier assembly may be manufactured according to another embodiment described herein, and may include more or fewer features than those described.

Figure 10:
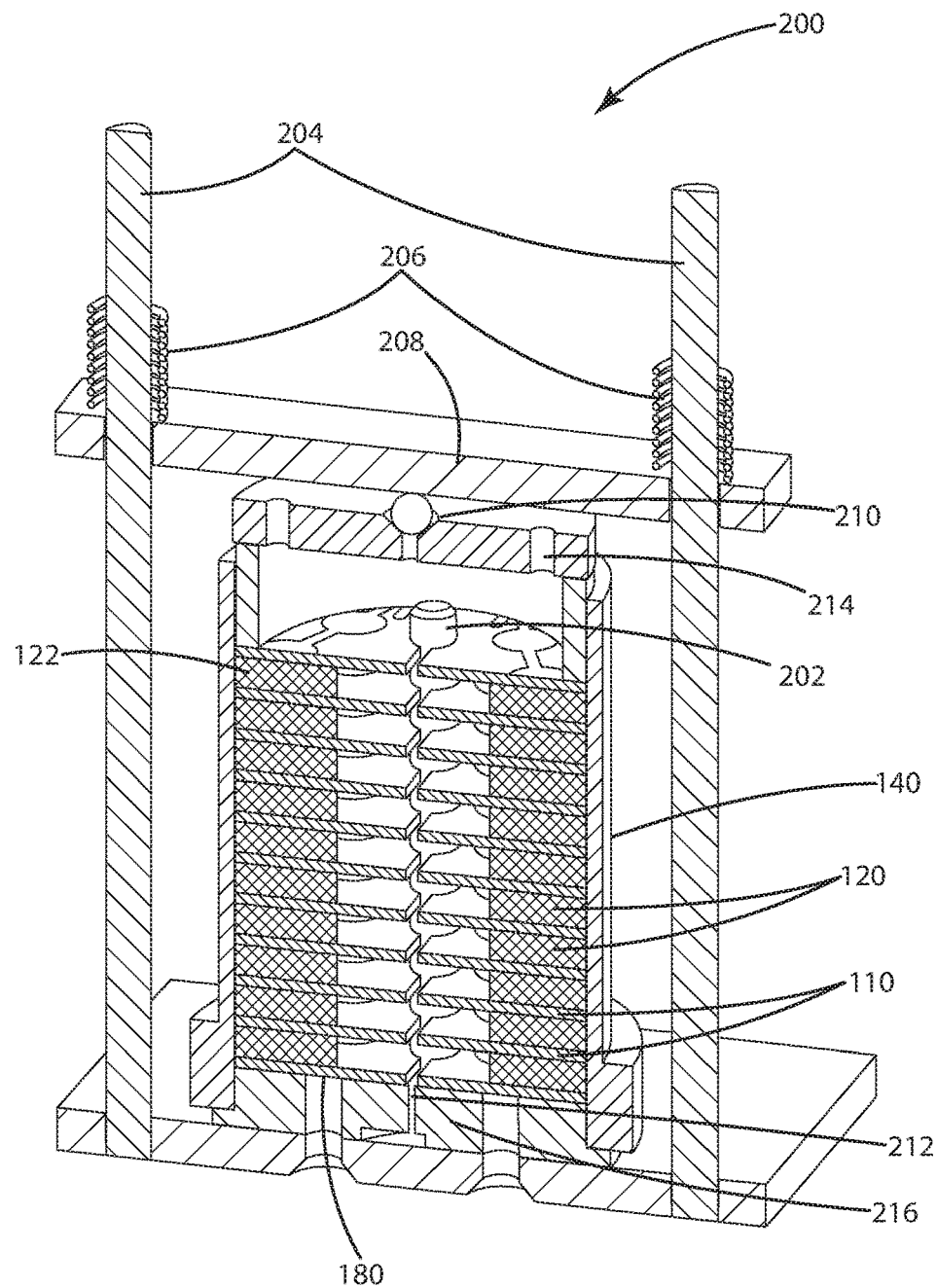
FIG. 10 shows a manufacturing jig for use in connection with manufacturing a multiplier assembly according to one embodiment.

In the illustrated embodiment of FIG. 10, the jig 200 includes a variety of features capable of facilitating assembly of the multiplier assembly 180. The jig 200 may include compression features, such as threaded rods 204, springs 206, a push plate 208, and a ball bearing 210, capable of compressing or holding together components of the multiplier assembly 180 for reflow soldering. As mentioned herein, an alignment rod, such as the alignment rod 208, may be received by the support elements 110 to aid in stacking the multiplier assembly 180. Vents 212, 214 may be disposed in areas of the jig 200 to direct forming gas, such as gas comprising 96% nitrogen and 4% hydrogen, to purge the multiplier assembly 180 and prevent oxidation during reflow soldering. A thermocouple (not shown) may be disposed in a thermocouple port 216, which may share a vent port, to monitor the temperature of multiplier assembly 180 during reflow soldering.

The method 1000 of manufacturing the multiplier assembly using the jig 200 may include the step of providing a first plurality of capacitors and a second plurality of capacitors. Step 1002. The method may also include stacking a plurality of support elements 110, the first plurality of capacitors 120a-c, and the second plurality of capacitors 122a-c. Step 1004. The capacitors 120a-c, 122a-c may be stacked with flux on the support elements 110, which may be placed on the alignment rod 208 to facilitate arrangement of the multiplier assembly 180. The first plurality of capacitors 120a-c may form a first capacitor string, and the second plurality 122a-c of capacitors may form a second capacitor string. Within the multiplier stack 180, capacitors 120a-c in each segment of the first string, which form part of a stage 150, may be electrically and mechanically connected to capacitors of the first capacitor string in an adjacent stage by at least one of the support elements 110. And, capacitors 122a-c in each segment of the second string, which form part of a stage 150, may be electrically and mechanically connected to capacitors of the second capacitor string in an adjacent stage by at least one of the support elements 110. The compression features of the jig 200 may apply compression force, such as approximately 10-30 lbs. of force, to compress the multiplier assembly 180 such that the multiplier assembly 180 remains in a stacked arrangement during the reflow process. Step 1008.

The jig 200 may be placed in a forced air oven at a suitable temperature, such as 260° C. When the internal temperature indicated by the thermocouple is sufficient to cause reflow (e.g., a temperature between 230-240° C. for Tin-silver-copper solder (SAC)), the assembly may be removed from the oven, and allowed to cool while forming gas is supplied through the jig 200. Step 1010.

As mentioned above, the method may include stacking the plurality of support elements 110, the first plurality of capacitors 120a-c, the second plurality of capacitors 122a-c, and a plurality of diodes 130, 132. Each of the diodes 130, 132 may be electrically connected to form at least part of an electrical connection between the first capacitor string and the second capacitor string. The diodes 130, 132 may be soldered individually after the reflow process. Step 1012. Alternatively, the diodes 130, 132 may be inserted prior to reflow. The multiplier assembly 180 may be cleaned by ultrasonication in flux remover and other suitable solvents. Step 1014.

In order to facilitate stacking components of the multiplier assembly, a rod or alignment pin, as mentioned above, may be utilized. For example, a space or hole defined by the support elements 110 may receive the alignment pin 208 such that the support elements 110 may be stacked along the alignment pin 208 during manufacture. The alignment pin may be removed later, if desired, including, for example, after the assembly is reflow soldered.

As described herein, the multiplier assembly according to one embodiment includes a dielectric 140, such as Teflon® or glass. The dielectric 140 may be disposed about the multiplier stack assembly or within the multiplier stack, or both, along its central axis. Step 1006. For example, the dielectric may be a cylindrical tube which partially surrounds components of the multiplier assembly. Additionally or alternatively, a dielectric shield may be disposed through spaces in each of the support elements such that the shield is disposed between the two capacitor strings. For purposes of disclosure, the method 1000 is described in connection with a dielectric in the multiplier assembly. However, it should be understood that a dielectric may not be included as indicated in phantom line in FIG. 9.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A multiplier assembly for a power supply, the multiplier assembly including a power input and a power output, said multiplier assembly comprising:

a first plurality of capacitors electrically coupled to form a first capacitor string, wherein said first capacitor string is connected to the power input;

a second plurality of capacitors electrically coupled to form a second capacitor string, wherein said second capacitor string is connected to the power output, wherein said first capacitor string and said second capacitor string define a plurality of stages of said multiplier assembly;

a plurality of support elements mechanically supporting said first plurality of capacitors and said second plurality of capacitors, wherein each of said plurality of stages includes at least one stage support element from among said support elements, wherein said at least one stage support element electrically connects at least two of said first plurality of capacitors and electrically connects at least two of said second plurality of capacitors, wherein said at least two of said first plurality of capacitors includes a first capacitor and a third capacitor, wherein said at least two of said second plurality of capacitors includes a second capacitor and a fourth capacitor; and wherein said at least one stage support element includes a first side and a second side opposite said first side, wherein said first side includes a first conductive feature and a second conductive feature, wherein said second side includes a third conductive feature and a fourth conductive feature, wherein said first conductive feature is soldered to said first capacitor of said first plurality of capacitors and said second conductive feature is soldered to said second capacitor of said second plurality of capacitors, and wherein said third conductive feature is soldered to a third capacitor of said first plurality of capacitors and said fourth conductive feature is soldered to said fourth capacitor of said second plurality of capacitors.

2. The multiplier assembly as claimed in claim 1 wherein said first capacitor string and said second capacitor string further define a first end stage of the multiplier assembly;

wherein said first end stage includes a first terminal capacitor of said first capacitor string and a second terminal capacitor of said second capacitor string, wherein said first terminal capacitor is connected to the power input;

wherein said first end stage includes a first support element mechanically supporting and electrically connected to said first terminal capacitor and said second terminal capacitor; and wherein said first support element terminates a first end of said multiplier assembly without electrically connecting to additional series capacitors of said first capacitor string and said second capacitor string.

3. The multiplier assembly as claimed in claim 2 wherein said first capacitor string and said second capacitor string further define a second end stage of the multiplier assembly, said second end stage being one of said plurality of stages;

wherein said second end stage includes a third terminal capacitor of said first capacitor string and a fourth terminal capacitor of said second capacitor string, wherein said fourth terminal capacitor of said second capacitor string is electrically connected to the power output; and wherein said second end stage includes at least one of said plurality of support elements, wherein said second end stage includes an end support element that terminates a second end of said multiplier assembly, wherein said end support element mechanically supports and electrically connects to said third terminal capacitor and said fourth terminal capacitor without electrically connecting to additional series capacitors of said first capacitor string and said second capacitor string.

4. The multiplier assembly as claimed in claim 1 further comprising a plurality of diodes, each of said plurality of diodes forming at least part of an electrical connection between said first capacitor string and said second capacitor string, wherein said first capacitor string, said second capacitor string, and said plurality of diodes define said plurality of stages of said multiplier assembly.

5. The multiplier assembly as claimed in claim 4 wherein said at least one stage support element electrically connects a first diode of said plurality of diodes between said first capacitor of said first capacitor string and said second capacitor of said second capacitor string, wherein said first and second capacitors are electrically and mechanically connected to said at least one stage support element.

6. The multiplier assembly as claimed in claim 5 wherein said at least one stage support element electrically connects a second diode of said plurality of diodes to said first capacitor of said first capacitor string, wherein said second diode is electrically connected to said second capacitor of said second capacitor string via at least one adjacent stage support element of an adjacent stage.

7. The multiplier assembly as claimed in claim 1 wherein each of said plurality of stages includes at least two stage support elements, wherein a first of said at least two stage support elements electrically connects at least two capacitors in series from said first capacitor string, wherein a second of said at least two stage support elements electrically connects at least two capacitors in series from said second capacitor string.

8. The multiplier assembly as claimed in claim 1 wherein each of said support elements includes at least one space that physically separates portions of said support element, wherein said at least one space defines a conductive break between said portions of said support element.

9. The multiplier assembly as claimed in claim 1 wherein each of said support elements is a circuit board having said first side and said second side opposite said first side, wherein each of said first and second sides includes conductive features, wherein said conductive features include two capacitor solder pads on said first side and two capacitor solder pads on said second side.

10. The multiplier assembly as claimed in claim 9 wherein said capacitor solder pads on both said first and second sides are undersized relative to terminals of said first and second plurality of capacitors.

11. The multiplier assembly as claimed in claim 1 wherein said plurality of support elements, said first plurality of capacitors, and said second plurality of capacitors are stacked together to form said multiplier assembly.

12. The multiplier assembly as claimed in claim 1 further comprising a dielectric at least partially surrounding said plurality of support elements, said first plurality of capacitors, and said second plurality of capacitors.

13. The multiplier assembly as claimed in claim 12 wherein said dielectric is a cylindrical shield.

14. The multiplier assembly as claimed in claim 1 further comprising a shield formed of a strip disposed along a primary axis of the multiplier assembly.

15. A high-voltage power supply including a plurality of stages that form a multiplier stack assembly, each stage including first and second capacitors, said high-voltage power supply comprising:

a support element coupled between first and second stages of the plurality of stages, said first and second stages being adjacent, said support element including a first conductive feature capable of electrically and mechanically connecting to said first capacitor of said first stage, said support element including a second conductive feature capable of electrically and mechanically connecting to said second capacitor of said first stage, wherein said first and second capacitors of said first stage are electrically coupled to said second stage respectively via said first and second conductive features to form at least part of said multiplier stack assembly; and wherein said support element includes a first side and a second side opposite said first side, wherein said first side includes said first conductive feature and said second conductive feature, wherein said second side includes a third conductive feature and a fourth conductive feature, wherein said first conductive feature is soldered to said first capacitor of said first stage and said second conductive feature is soldered to said second capacitor of said first stage, and wherein said third conductive feature is soldered to said first capacitor of said second stage and said fourth conductive feature is soldered to said second capacitor of said second stage.

16. The high-voltage power supply as claimed in claim 15 further comprising a first end support element and a second end support element, wherein said first end support element is electrically connected to a first terminal stage of said multiplier stack assembly, wherein said second end support element is electrically connected to a second terminal stage of said multiplier stack assembly.

17. The high-voltage power supply as claimed in claim 15 wherein said third conductive feature of said support element is capable of electrically and mechanically connecting to said first capacitor of said second stage, wherein said fourth conductive feature of said support element is capable of electrically and mechanically connecting to said second capacitor of said second stage, wherein said first and second capacitors of said second stage are electrically coupled to said first stage respectively via said third and fourth conductive features to form at least part of said multiplier stack assembly.

18. The high-voltage power supply as claimed in claim 15 wherein said support element includes at least one space that physically separates portions of said support element, wherein said at least one space forms a conductive break between said portions of said support element.

19. The high-voltage power supply as claimed in claim 15 wherein said support element is a circuit board having said first side and said second side opposite said first side, wherein each of said first and second sides includes conductive features, wherein said conductive features include two capacitor solder pads on said first side and two capacitor solder pads on said second side.

20. The high-voltage power supply as claimed in claim 19 wherein said capacitor solder pads on both said first and second sides are undersized relative to terminals of said first and second capacitors of said first and second stages.

21. The high-voltage power supply as claimed in claim 15 further comprising a dielectric that at least partially surrounds said support element.

22. The high-voltage power supply as claimed in claim 15 further comprising a shield disposed in a space of said support element, said space being between said first capacitor of said first stage and said second capacitor of said first stage.

23. The high-voltage power supply as claimed in claim 15 further comprising a power source configured to drive said multiplier stack assembly based on feedback.

24. The high-voltage power supply as claimed in claim 23 wherein said power source is calibrated to control power output based on feedback indirectly indicative of the power output.

25. The high-voltage power supply as claimed in claim 23 further comprising feedback circuitry adapted to provide said feedback to said power source, wherein said feedback circuitry includes at least one of a pickup winding coupled to a primary of said power source, a resistive strip disposed on a dielectric shield, and a resistive element coupled to an intermediate stage of the multiplier stack assembly.

26. The high-voltage power supply as claimed in claim 23 wherein said power source is configured to control duty cycle of a signal applied to the multiplier assembly to affect an output of the multiplier assembly.

27. A method of manufacturing a multiplier assembly, the multiplier assembly adapted to be installed in a high-voltage power supply, said method comprising:
   providing a first plurality of capacitors and a second plurality of capacitors; and
   stacking a plurality of support elements, the first plurality of capacitors, and the second plurality of capacitors, wherein the first plurality of capacitors form a first capacitor string and the second plurality of capacitors form a second capacitor string, wherein each of the first plurality of capacitors of the first capacitor string is electrically and mechanically connected to an adjacent capacitor of the first capacitor string by at least one of the support elements, wherein each of the second plurality of capacitors of the second capacitor string is electrically and mechanically connected to an adjacent capacitor of the second capacitor string by at least one of the support elements, wherein each of the plurality of support elements includes a first side with a first conductive feature and a second conductive feature, wherein each of the plurality of support elements includes a second side with a third conductive feature and a fourth conductive feature;
   soldering a first capacitor of the first plurality of capacitors to the first conductive feature of a first one of the support elements;
   soldering a second capacitor of the second plurality of capacitors to the second conductive feature of the first one of the support elements;
   soldering a third capacitor of the first plurality of capacitors to the third conductive feature of the first one of the support elements; and
   soldering a fourth capacitor of the second plurality of capacitors to the fourth conductive feature of the first one of the support elements.

28. The method of manufacturing the multiplier assembly as claimed in claim 27 wherein said stacking includes stacking the plurality of support elements, the first plurality of capacitors, the second plurality of capacitors, and a plurality of diodes, wherein each of the diodes is electrically connected to form at least part of an electrical connection between the first capacitor string and the second capacitor string.

29. The method of manufacturing the multiplier assembly as claimed in claim 27 further comprising stacking the plurality of support elements with at least one alignment pin, wherein the plurality of support elements include at least one hole that receives the at least one alignment pin.

30. The method of manufacturing the multiplier assembly as claimed in claim 27 further comprising disposing at least one dielectric along a central axis of the multiplier assembly, wherein the at least one dielectric is at least one of (a) disposed through a space of each of the support elements and (b) disposed to at least partially surround the multiplier assembly.

* * * * *